(12) United States Patent
Chen (10) Patent No.: US 11,711,855 B2
(45) Date of Patent: *Jul. 25, 2023

(54) RANDOM ACCESS METHOD, TERMINAL, AND NETWORK DEVICE

(71) Applicant: VIVO MOBILE COMMUNICATION CO., LTD., Guangdong (CN)

(72) Inventor: Li Chen, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/887,315

(22) Filed: Aug. 12, 2022

(65) Prior Publication Data
US 2022/0386386 A1   Dec. 1, 2022

Related U.S. Application Data

(63) Continuation of application No. 17/094,647, filed on Nov. 10, 2020, now Pat. No. 11,452,142, which is a
(Continued)

(30) Foreign Application Priority Data

May 10, 2018   (CN) .......................... 201810444829.9

(51) Int. Cl.
*H04W 74/08*   (2009.01)
*H04L 41/0896*   (2022.01)
(Continued)

(52) U.S. Cl.
CPC ..... *H04W 74/0833* (2013.01); *H04L 41/0896* (2013.01); *H04W 72/23* (2023.01); *H04W 74/008* (2013.01); *H04W 84/042* (2013.01)

(58) Field of Classification Search
CPC .......... H04W 74/0833; H04W 72/042; H04W 74/008; H04W 84/042; H04W 48/12;
(Continued)

(56) References Cited

U.S. PATENT DOCUMENTS

2014/0177556 A1   6/2014   Pan et al.
2019/0313437 A1*  10/2019  Jung ................. H04W 72/0453
(Continued)

FOREIGN PATENT DOCUMENTS

CN   102202324 A    9/2011
WO   2018063944 A1  4/2018

OTHER PUBLICATIONS

European Search Report in Application No. 19800708.0 dated Nov. 6, 2021.
(Continued)

*Primary Examiner* — Don N Vo
(74) *Attorney, Agent, or Firm* — Maschoff Brennan (57) ABSTRACT

The present disclosure provides a random access method, a terminal, and a network device. The random access method of the present disclosure comprises: receiving configuration information concerning a currently activated downlink bandwidth part (BWP) or a serving cell; detecting a random access response (RAR) in a random access procedure according to the configuration of a control resource set (CORESET) in the configuration information of the currently activated downlink BWP or the configuration information of the serving cell.

20 Claims, 4 Drawing Sheets

Related U.S. Application Data continuation of application No. PCT/CN2019/085106, filed on Apr. 30, 2019.

(51) Int. Cl.
*H04W 74/00* (2009.01)
*H04W 72/23* (2023.01)
*H04W 84/04* (2009.01)

(58) Field of Classification Search
CPC ............ H04W 72/0453; H04W 74/006; H04L 41/0896; H04L 41/0803
USPC .......................................................... 375/267
See application file for complete search history.

(56) References Cited

U.S. PATENT DOCUMENTS

| | | | | |
|---|---|---|---|---|
| 2020/0274750 | A1* | 8/2020 | Yl ........................ | H04L 27/2659 |
| 2020/0313832 | A1* | 10/2020 | Kim ....................... | H04W 24/10 |
| 2020/0367288 | A1* | 11/2020 | Dahlman .......... | H04W 74/0833 |
| 2021/0127367 | A1* | 4/2021 | Yi ........................ | H04W 72/042 |

OTHER PUBLICATIONS

"Remaining details of RACH procedure" 3GPP TSG RAN WG1 Meeting #92bis, ZTE, Sanechips, R1-1803610, Apr. 16, 2018.
"Summary 2 on Remaining issues on Beam Failure Recovery Document for: Discussion" 3GPP TSG RANWG1 Meeting #92bis, MediaTek Inc., R1-1805689, Apr. 16, 2018.
"Remaining issues for BWP" 3GPP TSG-RAN2 Meeting #100, Huawei, HiSilicon, R2-1712326, Nov. 27, 2017.
"Further considerations on the RA procedure" 3GPP TSG-RAN WG2 Meeting #100, CATT, R2-1712856, Nov. 27, 2017.
"Summary of E-mail discussion on [99bis#43][NRUP/MAC] Impact of BWP" 3GPP TSG-RAN WG2 Meeting #100, LG Electronics Inc., R2-1713879, Nov. 27, 2017.
"BWP impact to RLM configuration (E396)" 3GPP TSG-RAN WG2 #101, Ericsson, R2-1802780, Feb. 26, 2018.
"Disabling UE capability for access to 5GC" 3GPP TSG-RAN WG2 #101, NEC, R2-1803610, Feb. 26, 2018.
Written Opinion and International Search Report in Application No. PCT/CN2019/085106 dated Jul. 29, 2019.
Office Action in U.S. Appl. No. 17/094,647, dated Mar. 15, 2022.
Samsung., "Miscellaneous corrections," 3GPP TSG-RAN WG2 Meeting #101 bis, R2-1806229, pp. 1-68, (Apr. 16-20, 2018).
EP Office Action dated Apr. 18, 2023 as received in Application No. 19800708.0.

* cited by examiner

RANDOM ACCESS METHOD, TERMINAL, AND NETWORK DEVICE

CROSS-REFERENCE TO RELATED APPLICATIONS

The present application is a continuation application of U.S. patent application Ser. No. 17/094,647 filed on Nov. 10, 2020 which is a continuation application of International Application No. PCT/CN2019/085106 filed on Apr. 30, 2019, which claims priority of Chinese Patent Application No. 201810444829.9 filed in China on May 10, 2018, both of which are incorporated herein by reference in their entireties.

TECHNICAL FIELD

The present disclosure relates to the field of communication applications technologies, and in particular, to a random access method, a terminal, and a network device.

BACKGROUND

5G New Radio (New Radio) supports a maximum system bandwidth of 400 MHz, which is far greater than a maximum system bandwidth of 20 MHz in Long Term Evolution (Long Term Evolution, LTE), to support greater system and user throughput.

However, supporting such a large system bandwidth will be a huge challenge for implementing user equipment (User Equipment, UE) or a terminal, which is not conducive to implementation of low-cost UE. In addition, even if large-bandwidth UE is implemented, it is not necessary to always work in large-bandwidth working mode, and only a part of bandwidth may be opened to save power.

Therefore, the 5G NR system also supports dynamic and flexible bandwidth allocation, and the system bandwidth is divided into a plurality of bandwidth parts (bandwidth part, BWP), to support access of narrow-band terminals or terminals in energy-saving mode.

The 5G NR system supports working frequency bands of 6 GHz or more, and may provide greater throughput for data transmission. A high frequency signal has a shorter wavelength. Compared with a low frequency band, more antenna arrays can be arranged on a same-size panel, and a beamforming technology can be used to form a plurality of beams having higher directivity and narrower lobes. The 5G NR system sends broadcast signals or system information to terminal users in a cell by using a beam scanning technology.

In the related technologies, both LTE and NR need to implement a plurality of objectives by supporting random access processes. In the related technologies, objectives of random access discussed in the NR may be as follows:

1. Support connecting an initial radio resource control idle UE (RRC idle UE) to a network.

2. RRC reconstruction.

3. Cell handover.

4. Downlink data arrives but uplink is out of step.

5. Uplink data arrives but downlink is out of step.

6. UE changes from an inactive state to an active state.

7. Support uplink synchronization acquisition of a serving cell (Scell).

8. Request for on-demand system information (on-demand SI).

9. Beam failure recovery.

In the related technologies, the random access process is divided into a contention based random access process and a contention free random access process.

The contention based random access process includes four steps of access: Message 1 to Message 4, and the contention free random access process includes only two steps of access: Message 1 and Message 2.

Message 2 of either contention based random access or contention free random access is sending a random access response (Random Access Response, RAR). UE monitors, in a RAR window, a RAR corresponding to a random access-radio network temporary identifier (RA-RNTI).

In the contention based random access, there is a problem that the UE may send a same preamble to same physical random access (PRACH) resources. Therefore, after receiving Message 2, the UE further needs to send Message 3 based on an uplink grant (UL grant) in Message 2. In addition, the UE may carry an identifier of the UE on Message 3, and start a contention resolution timer simultaneously when sending Message 3. Before the contention resolution timer times out, if the UE receives Message 4 sent by a base station, contention resolution by the UE succeeds. The base station may carry the identifier of the UE in Message 4. The UE can determine, based on the identifier of the UE carried in Message 4, whether it is its own message, thereby determining whether the competition succeeds.

A synchronization signal block (SSB) is composed of a primary synchronization signal (Primary synchronization signal, SSS), a secondary synchronization signal (Secondary synchronization signal, PSS), and a physical broadcast channel (Physical broadcast channel, PBCH), occupying four symbols in time domain, and 240 subcarriers (20 PRBs) in total in frequency domain, where a master information block (master information block, MIB) message is carried in the PBCH. A maximum quantity of SSB indexes is 64, and beam directions of non-overlapping SSBs in each time domain are different. Mainly used for initial access, cell handover, beam management, and the like.

According to protocol regulations of the NR in the related technologies, a control resource set (CORESET) #0 is configured based on MIB information carried by the SSB and serving cell configuration (Serving Cell Config Common) information.

A MIB includes 8 bits. A table specified in the protocol is selected based on the SSB and a subcarrier spacing of the CORESET #0. Each table includes indexes of 0-15, and 4 bits are used to indicate to select one index, which indicates a frequency domain length of the CORESET, a frequency domain location relative to the SSB, a time domain length, and the like.

Another table specified in the protocol is selected based on a multiplexing parameter in the index indicated by the first 4 bits, FR 1 or FR 2, a subcarrier spacing (subcarrier spacing, SCS), and a subcarrier spacing of a default control resource set (CORESET #0). Each table includes indexes of 0-15, and 4 bits are used to indicate to select one index, which indicates a location of a first symbol in time domain, other information, and the like.

For an active downlink bandwidth part (DL BWP), if a CORESET corresponding to a RAR is not explicitly configured, behavior of the UE is unclear.

5G in the related technologies agrees that in the random access process, an uplink BWP on which Message 1 is sent and an active downlink BWP on which Message 2 is received need to have a same BWP number. If there is no corresponding CORESET #0 on the active downlink BWP, behavior of the UE is unclear.

In the foregoing two cases, when the behavior of the UE is unclear, communication may be interrupted.

SUMMARY

The present disclosure aims to provide a random access method, a terminal, and a network device, to resolve the problem that for an active downlink BWP, when there is no explicitly configured CORESET corresponding to a RAR or there is no corresponding CORESET #0, behavior of UE is unclear.

According to a first aspect, an embodiment of the present disclosure provides a random access method applied to a terminal, including:

receiving configuration information of a currently active downlink bandwidth part BWP or a serving cell; and monitoring a random access response RAR in a random access process based on a configuration of a control resource set CORESET in the configuration information of the currently active downlink BWP or the serving cell.

According to a second aspect, an embodiment of the present disclosure further provides a random access method applied to a network device, including:

sending configuration information of a currently active downlink bandwidth part BWP, where the configuration information of the currently active downlink BWP includes a configuration of a control resource set CORESET.

According to a third aspect, an embodiment of the present disclosure further provides a terminal, including:

a receiving module, configured to receive configuration information of a currently active downlink bandwidth part BWP or a serving cell; and a monitoring module, configured to monitor a random access response RAR in a random access process based on a configuration of a control resource set CORESET in the configuration information of the currently active downlink BWP or the serving cell.

According to a fourth aspect, an embodiment of the present disclosure further provides a terminal, including: a memory, a processor, and a computer program stored in the memory and executable on the processor, where the computer program, when executed by the processor, implements the steps of the foregoing random access method applied to the terminal.

According to a fifth aspect, an embodiment of the present disclosure further provides a network device, including:

a fifth sending module, configured to send configuration information of a currently active downlink bandwidth part BWP, where the configuration information of the currently active downlink BWP includes a configuration of a control resource set CORESET.

According to a sixth aspect, an embodiment of the present disclosure further provides a network device, including: a memory, a processor, and a computer program stored in the memory and executable on the processor, where the computer program, when executed by the processor, implements the step of the foregoing random access method applied to the network device.

According to a seventh aspect, an embodiment of the present disclosure further provides a computer readable storage medium, where the computer readable storage medium stores a computer program, and the computer program, when executed by the processor, implements the steps of the foregoing random access methods.

The embodiments of the present disclosure have the following beneficial effects:

According to the foregoing technical solutions of the embodiments of the present disclosure, configuration information of a currently active downlink bandwidth part BWP or a serving cell is received; and a random access response RAR in a random access process is monitored based on a configuration of a control resource set CORESET in the configuration information of the currently active downlink BWP or the serving cell. Therefore, the problem that for an active downlink BWP, when there is no explicitly configured CORESET corresponding to a RAR or there is no corresponding CORESET 0, behavior of UE is unclear, is resolved.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DESCRIPTION OF EMBODIMENTS

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, these embodiments are provided to help more thoroughly understand the present disclosure and entirely convey the scope of the present disclosure to those skilled in the art.

In the specification and claims of this application, the terms such as "first" and "second" are used for distinguishing similar objects, and are not necessarily used to describe a particular order or sequence. It should be understood that data used in such a way can be exchanged in proper situations, so that the embodiments of the present disclosure described herein can be implemented in sequences other than those illustrated or described herein. In addition, the terms "comprise", "include" and any variants thereof are intended to cover non-exclusive inclusion. For example, a process, a method, a system, a product, or a device that includes a series of steps or units are not necessarily limited to those steps or units listed expressly, but instead may include other steps or units not expressly listed or inherent to the process, the method, the system, the product, or the device. "And/or" used in the specification and claims means at least one of the connected objects.

The following description provides examples and does not limit the scope, applicability, or configuration set forth in the claims. Alterations may be made to functions and arrangements of the discussed elements without departing from the spirit and scope of the present disclosure. In various examples, various procedures or components may be omitted, replaced, or added appropriately. For example, the described methods can be performed in a different order than that described, and various steps can be added, omitted, or combined. In addition, features described with reference to some examples may be combined in other examples.

Figure 1:
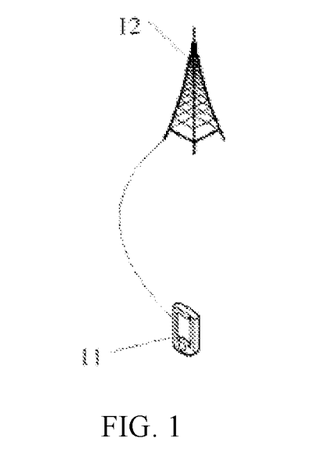
FIG. 1 is a structural diagram of a network system to which an embodiment of the present disclosure can be applied.

Referring to FIG. 1, FIG. 1 is a structural diagram of a network system to which an embodiment of the present disclosure can be applied. As shown in FIG. 1, the network system includes a user terminal 11 and a base station 12, where the user terminal 11 may be user equipment (User Equipment, UE), for example, may be a terminal side device such as a mobile phone, a tablet computer, a laptop computer, a personal digital assistant (personal digital assistant, PDA), a mobile Internet device (Mobile Internet Device, MID), or a wearable device. It should be noted that a specific type of the user terminal 11 is not limited in this embodiment of the present disclosure. The foregoing base station 12 may be a base station of 5G or later releases (for example, a gNB or a 5G NR NB), or a base station in other communications systems, or referred to as a NodeB, an evolved NodeB, a transmitting receiving point (transmitting receiving point, TRP), or another term in the art. Provided that the same technical effects are achieved, the base station is not limited to a specific technical term. It should be noted that in the embodiments of the present disclosure, the 5G base station is merely used as an example, but does not limit a specific type of the base station 12.

Figure 2:
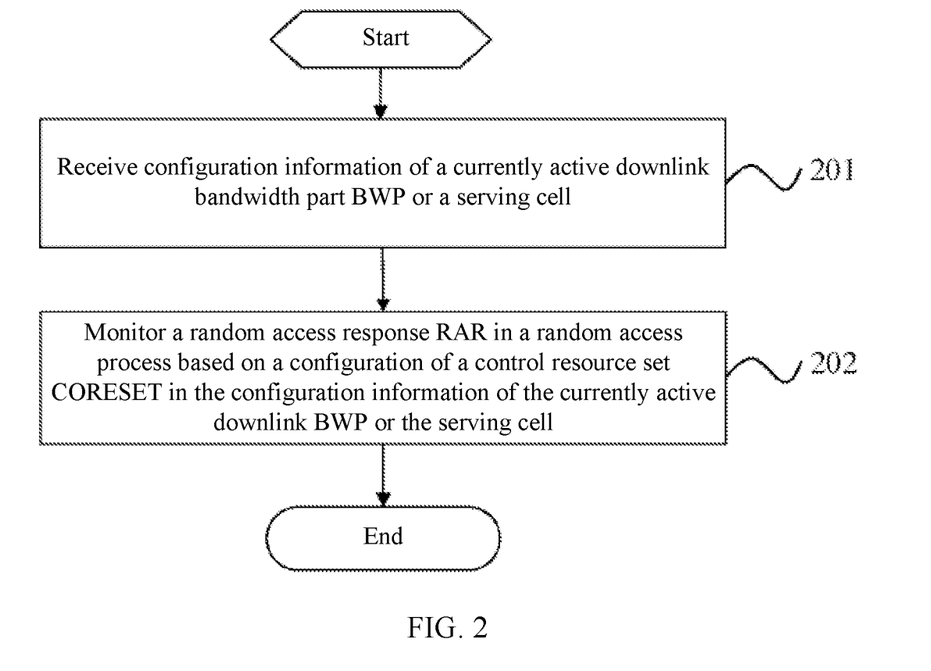
FIG. 2 is a first schematic flowchart of a random access method according to an embodiment of the present disclosure.

FIG. 2 is a schematic flowchart of a random access method according to an embodiment of the present disclosure. As shown in FIG. 2, the random access method provided in this embodiment of the present disclosure is applied to a terminal and includes the following steps:

Step 201: Receive configuration information of a currently active downlink bandwidth part BWP or a serving cell.

The configuration information of the currently active downlink bandwidth part BWP includes a configuration of a CORESET.

Step 202: Monitor a random access response RAR in a random access process based on a configuration of a control resource set CORESET in the configuration information of the currently active downlink BWP or the serving cell.

According to the random access method in this embodiment of the present disclosure, the configuration information of the currently active downlink bandwidth part BWP or the serving cell is received; and the random access response RAR in the random access process is monitored based on the configuration of the control resource set CORESET in the configuration information of the currently active downlink BWP or the serving cell. Therefore, the problem that for an active downlink BWP, when there is no explicitly configured CORESET corresponding to a RAR or there is no corresponding CORESET 0, behavior of UE is unclear, is resolved.

As a first optional implementation, Step 202 includes:

when no CORESET is explicitly configured on the currently active downlink BWP or the serving cell, monitoring the random access response RAR in the random access process based on a configuration of a default CORESET 0; or when a CORESET is configured on the currently active downlink BWP or the serving cell, monitoring the random access response RAR in the random access process based on the configured CORESET.

In the first optional implementation, during a random access process for objectives of switching, re-establishment, beam failure recovery, connection establishment, and the like, if CORESET is not explicitly configured, in a RACH process, a RAR is monitored by falling CORESET to CORESET #0. The specific implementation includes the following embodiments.

Embodiment 1

The foregoing step of monitoring the random access response RAR in the random access process based on a configuration of a default CORESET 0 includes: when the default CORESET 0 is configured on the currently active downlink BWP or the serving cell, monitoring the RAR in the random access process by directly falling back to the default CORESET 0 of the currently active downlink BWP or the serving cell.

Embodiment 2

The foregoing step of monitoring the random access response RAR in the random access process based on a configuration of a default CORESET 0 includes:

when the default CORESET 0 is not configured on the currently active downlink BWP or the serving cell, falling back to a first downlink BWP, and monitoring the RAR in the random access process on a default CORESET 0 on the first downlink BWP; or when the default CORESET 0 is configured on the currently active downlink BWP or the serving cell, falling back to a first downlink BWP, and monitoring the RAR in the random access process on a default CORESET 0 on the first downlink BWP, where the first downlink BWP is a specific BWP, and the first downlink BWP includes: an initial downlink BWP, or a non-initial downlink BWP configured with a default CORESET.

Further, before the falling back to a first downlink BWP, the method further includes:

sending a preamble on a currently active uplink bandwidth part BWP.

Further, after the falling back to a first downlink BWP, the method further includes:

sending a preamble on an uplink bandwidth part BWP corresponding to the first downlink BWP.

Further, the random access method in this embodiment of the present disclosure further includes:

when a random access attempt fails, sending the preamble on the active uplink BWP or on the uplink BWP corresponding to the first downlink BWP.

Embodiment 2 includes the following two specific solutions.

Solution 1: When the default CORESET 0 is not configured on the currently active downlink BWP or the serving cell, fall back to a default CORESET 0 on a specific BWP (the first downlink BWP), and use the default CORESET 0 on the specific BWP.

Further, before falling back to the specific BWP, UE sends a preamble on a currently active uplink bandwidth part BWP.

The UE monitors the RAR in the random access process on the default CORESET 0 of the specific BWP.

If this random access attempt fails, a subsequent preamble is sent on the active uplink BWP or on an uplink BWP corresponding to the specific downlink BWP.

Solution 2: When the default CORESET 0 is not configured on the currently active downlink BWP or the serving cell, fall back to a default CORESET 0 on a specific BWP (the first downlink BWP), and use the default CORESET 0 on the specific BWP.

Further, before falling back to the specific BWP, UE does not send a preamble on a currently active uplink bandwidth part BWP, but send the preamble after falling back to the specific BWP.

The UE monitors the RAR in the random access process on the default CORESET 0 of the specific BWP.

If the default CORESET 0 is configured on the currently active downlink BWP or the serving cell, perform the methods the same as that in Solution 1 and Solution 2.

Further, after the falling back to a first downlink BWP, the method further includes:

resetting at least one of a preamble transmission counter or a power ramping counter.

For the foregoing Solution 1 and Solution 2, after falling back to the specific BWP, the UE reset at least one of a preamble transmission counter or a power ramping counter.

Further, in the foregoing first optional implementation, the random access process includes: contention free random access CFRA and contention based random access CBRA, and specifically includes: falling back from contention free random access CFRA to contention free random access CFRA on the first downlink BWP; or falling back from contention free random access CFRA to contention based random access CBRA on the first downlink BWP.

The foregoing falling back to a first downlink BWP includes:

falling back from contention free random access CFRA to contention free random access CFRA on the first downlink BWP; or falling back from contention free random access CFRA to contention based random access CBRA on the first downlink BWP.

As a second optional implementation, the foregoing Step 202 includes: when no control resource set CORESET or default control resource set CORESET corresponding to contention free random access CFRA is configured on the currently active downlink BWP or the serving cell, monitoring the RAR by falling back to a default CORESET 0 of a second downlink BWP; or when no control resource set CORESET or default CORESET corresponding to contention based random access CBRA is configured on the currently active downlink BWP or the serving cell, monitoring the RAR by falling back to a default CORESET 0 of a third downlink BWP; or when no control resource set CORESET or default control resource set CORESET corresponding to contention free random access CFRA is configured on the currently active downlink BWP or the serving cell, but a control resource set CORESET or default CORESET corresponding to contention based random access CBRA is configured on the currently active downlink BWP, monitoring the RAR by falling back to the control resource set CORESET or the default CORESET 0 of the CBRA on the currently active downlink BWP; or when no control resource set CORESET or default control resource set CORESET corresponding to contention based random access CBRA is configured on the currently active downlink BWP or the serving cell, but a control resource set CORESET or default CORESET corresponding to contention free random access CFRA is configured on the currently active downlink BWP, monitoring the RAR by falling back to the control resource set CORESET or the default CORESET 0 of the CFRA on the currently active downlink BWP, where the second downlink BWP or the third downlink BWP includes: an initial downlink BWP, or a non-initial downlink BWP configured with a default CORESET, or a BWP configured with a control resource set CORESET or default CORESET corresponding to the CBRA or the CFRA.

As a third optional implementation, before the foregoing Step 202, the method further includes: when the currently active downlink BWP overlaps a fourth BWP, sending a random access preamble by using a public random access configuration broadcast on the fourth BWP or using resources of a public random access configuration configured by dedicated radio resource control RRC signaling, where the fourth BWP includes: an initial downlink BWP, or a BWP overlapping the currently active downlink BWP.

In the third optional implementation, by reusing the public random access configuration of the overlapping BWP, RRC signaling overheads are reduced.

According to the random access method in this embodiment of the present disclosure, the configuration information of the currently active downlink bandwidth part BWP or the serving cell is received; and the random access response RAR in the random access process is monitored based on the configuration of the control resource set CORESET in the configuration information of the currently active downlink BWP or the serving cell. Therefore, the problem that for an active downlink BWP, when there is no explicitly configured CORESET corresponding to a RAR or there is no corresponding CORESET 0, behavior of UE is unclear, is resolved.

Figure 3:
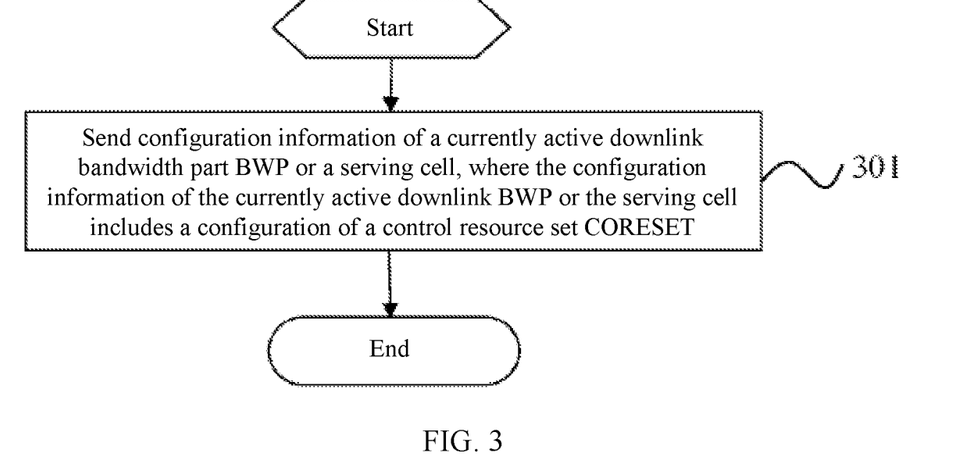
FIG. 3 is a second schematic flowchart of a random access method according to an embodiment of the present disclosure.

As shown in FIG. 3, an embodiment of the present disclosure further provides a random access method applied to a network device. The method includes the following step.

Step 301: Send configuration information of a currently active downlink bandwidth part BWP or a serving cell, where the configuration information of the currently active downlink BWP or the serving cell includes a configuration of a control resource set CORESET.

Further, after the sending configuration information of a currently active downlink bandwidth part BWP or a serving cell, the method further includes:

sending a random access response RAR in a random access process.

According to the random access method in this embodiment of the present disclosure, the configuration information of the currently active downlink bandwidth part BWP or the serving cell is sent to a terminal, so that the terminal monitors the random access response RAR in the random access process based on a configuration of a CORESET in the configuration information of the currently active downlink BWP or the serving cell. Therefore, the problem that for an active downlink BWP, when there is no explicitly configured CORESET corresponding to an RAR or there is no corresponding CORESET #0, behavior of UE is unclear, is resolved.

Figure 4:
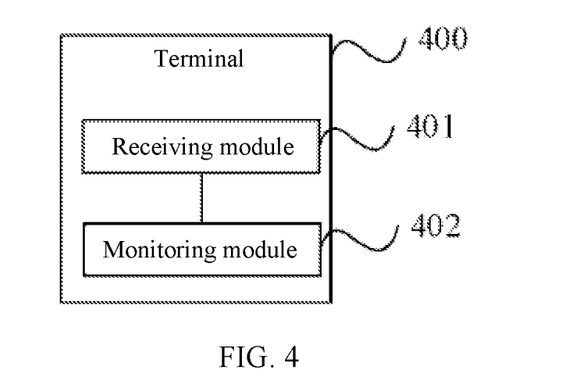
FIG. 4 is a schematic diagram of modules of a terminal according to an embodiment of the present disclosure.

FIG. 4 is a schematic diagram of modules of a terminal according to an embodiment of the present disclosure. As shown in FIG. 4, the terminal 400 provided in this embodiment of the present disclosure includes:

a receiving module 401, configured to receive configuration information of a currently active downlink bandwidth part BWP or a serving cell; and a monitoring module 402, configured to monitor a random access response RAR in a random access process based on a configuration of a control resource set CORESET in the configuration information of the currently active downlink BWP or the serving cell.

According to the terminal in this embodiment of the present disclosure, the monitoring module 402 is configured to: when no CORESET is explicitly configured on the currently active downlink BWP or the serving cell, monitor the random access response RAR in the random access process based on a configuration of a default CORESET 0; or when a CORESET is configured on the currently active downlink BWP or the serving cell, monitor the random access response RAR in the random access process based on the configured CORESET.

According to the terminal in this embodiment of the present disclosure, the monitoring module 402 is configured to: when the default CORESET 0 is configured on the currently active downlink BWP or the serving cell, monitor the RAR in the random access process by directly falling back to the default CORESET 0 of the currently active downlink BWP or the serving cell.

According to the terminal in this embodiment of the present disclosure, the monitoring module 402 is configured to: when the default CORESET 0 is not configured on the currently active downlink BWP or the serving cell, fall back to a first downlink BWP, and monitor the RAR in the random access process on a default CORESET 0 on the first downlink BWP; or when the default CORESET 0 is configured on the currently active downlink BWP or the serving cell, fall back to a first downlink BWP, and monitor the RAR in the random access process on a default CORESET 0 on the first downlink BWP, where the first downlink BWP includes: an initial downlink BWP, or a non-initial downlink BWP configured with a default CORESET.

The terminal in this embodiment of the present disclosure further includes:

a first sending module, configured to, before falling back to the first downlink BWP, send a preamble on a currently active uplink bandwidth part BWP.

The terminal in this embodiment of the present disclosure further includes:

a second sending module, configured to: after falling back to the first downlink BWP, send a preamble on an uplink bandwidth part BWP corresponding to the first downlink BWP.

The terminal in this embodiment of the present disclosure further includes:

a third sending module, configured to: when a random access attempt fails, send the preamble on the active uplink BWP or on the uplink BWP corresponding to the first downlink BWP.

The terminal in this embodiment of the present disclosure further includes:

a resetting module, configured to: after falling back to the first downlink BWP, reset at least one of a preamble transmission counter or a power ramping counter.

According to the terminal in this embodiment of the present disclosure, the monitoring module includes:

a fallback submodule, configured to: fall back from contention free random access CFRA to contention free random access CFRA on the first downlink BWP; or fall back from contention free random access CFRA to contention based random access CBRA on the first downlink BWP.

According to the terminal in this embodiment of the present disclosure, the monitoring module 402 is configured to: when no control resource set CORESET or default control resource set CORESET corresponding to contention free random access CFRA is configured on the currently active downlink BWP or the serving cell, monitor the RAR by falling back to a default CORESET 0 of a second downlink BWP; or when no control resource set CORESET or default CORESET corresponding to contention based random access CBRA is configured on the currently active downlink BWP or the serving cell, monitor the RAR by falling back to a default CORESET 0 of a third downlink BWP; or when no control resource set CORESET or default control resource set CORESET corresponding to contention free random access CFRA is configured on the currently active downlink BWP or the serving cell, but a control resource set CORESET or default CORESET corresponding to contention based random access CBRA is configured on the currently active downlink BWP, monitor the RAR by falling back to the control resource set CORESET or the default CORESET 0 of the CBRA on the currently active downlink BWP; or when no control resource set CORESET or default control resource set CORESET corresponding to contention based random access CBRA is configured on the currently active downlink BWP or the serving cell, but a control resource set CORESET or default CORESET corresponding to contention free random access CFRA is configured on the currently active downlink BWP, monitor the RAR by falling back to the control resource set CORESET or the default CORESET 0 of the CFRA on the currently active downlink BWP, where the second downlink BWP or the third downlink BWP includes: an initial downlink BWP, or a non-initial downlink BWP configured with a default CORESET, or a BWP configured with a control resource set CORESET or default CORESET corresponding to the CBRA or the CFRA.

The terminal in this embodiment of the present disclosure further includes:

a fourth sending module, configured to: when the currently active downlink BWP overlaps a fourth BWP, send a random access preamble by using a public random access configuration broadcast on the fourth BWP or using resources of a public random access configuration configured by dedicated radio resource control RRC signaling, where the fourth BWP includes: an initial downlink BWP, or a BWP overlapping the currently active downlink BWP.

According to the terminal in this embodiment of the present disclosure, the configuration information of the currently active downlink bandwidth part BWP or the serving cell is received; and the random access response RAR in the random access process is monitored based on the configuration of the control resource set CORESET in the configuration information of the currently active downlink BWP or the configuration information of the serving cell. Therefore, the problem that for an active downlink BWP, when there is no explicitly configured CORESET corresponding to a RAR or there is no corresponding CORESET 0, behavior of UE is unclear, is resolved.

An embodiment of the present disclosure further provides a terminal, including: a memory, a processor, and a computer program stored in the memory and executable on the processor, where the computer program, when executed by the processor, implements the processes of the foregoing embodiments of the random access method applied to the terminal, and the same technical effects can be achieved. To avoid repetition, details are not described herein again.

An embodiment of the present disclosure further provides a computer readable storage medium, where the computer readable storage medium stores a computer program, the computer program, when executed by the processor, implements the processes of the foregoing embodiments of the random access method applied to the terminal, and the same technical effects can be achieved. To avoid repetition, details are not described herein again. The computer readable storage medium may be a read-only memory (Read-Only Memory, ROM), a random access memory (Random Access Memory, RAM), a magnetic disk, a compact disc, or the like.

Figure 5:
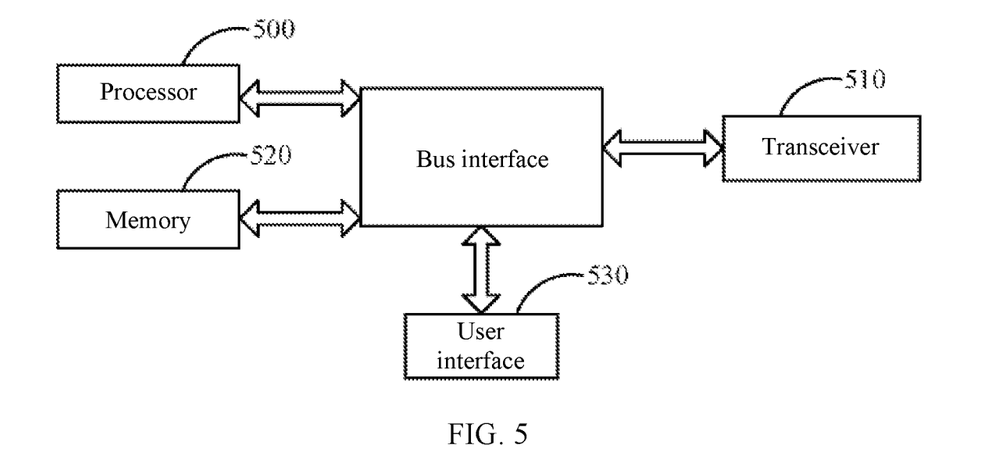
FIG. 5 is a first structural block diagram of a terminal according to an embodiment of the present disclosure.

To better achieve the foregoing objectives, as shown in FIG. 5, an embodiment of the present disclosure further provides a terminal, including a memory 520, a processor 500, a transceiver 510, a user interface 530, a bus interface, and a computer program stored in the memory 520 and executable on the processor 500, where the processor 500 is configured to read the program in the memory 520 to perform the following processes:

receiving configuration information of a currently active downlink bandwidth part BWP or a serving cell; and monitoring a random access response RAR in a random access process based on a configuration of a control resource set CORESET in the configuration information of the currently active downlink BWP or the configuration information of the serving cell.

In FIG. 5, a bus architecture may include any quantity of interconnected buses and bridges, which are specifically connected together by one or more processors represented by the processor 500 and various circuits of a memory represented by the memory 520. The bus architecture may further connect together various other circuits of a peripheral device, a voltage stabilizer, a power management circuit, and the like, which are known in this art and will not be further described herein. The bus interface provides an interface. The transceiver 510 may include a plurality of elements, that is, include a transmitter and a receiver, and provide units for communication with various other apparatuses on a transmission medium. For different user equipment, the user interface 530 may alternatively be an interface for externally and internally connecting required equipment. The connected equipment includes but is not limited to a keypad, a display, a speaker, a microphone, a joystick, and the like.

The processor 500 is responsible for management of the bus architecture and general processing. The memory 520 may store data used by the processor 500 when operations are performed.

Optionally, the processor 500 reads the program in the memory 520 to further perform the following processes:

when no CORESET is explicitly configured on the currently active downlink BWP or the serving cell, monitoring the random access response RAR in the random access process based on a configuration of a default CORESET 0; or when a CORESET is configured on the currently active downlink BWP or the serving cell, monitoring the random access response RAR in the random access process based on the configured CORESET.

Optionally, the processor 500 reads the program in the memory 520 to further perform the following process:

when the default CORESET 0 is configured on the currently active downlink BWP or the serving cell, monitoring the RAR in the random access process by directly falling back to the default CORESET 0 of the currently active downlink BWP or the serving cell.

Optionally, the processor 500 reads the program in the memory 520 to further perform the following processes:

when the default CORESET 0 is not configured on the currently active downlink BWP or the serving cell, falling back to a first downlink BWP, and monitoring the RAR in the random access process on a default CORESET 0 on the first downlink BWP; or when the default CORESET 0 is configured on the currently active downlink BWP or the serving cell, falling back to a first downlink BWP, and monitoring the RAR in the random access process on a default CORESET 0 on the first downlink BWP, where the first downlink BWP includes: an initial downlink BWP, or a non-initial downlink BWP configured with a default CORESET.

Optionally, the processor 500 reads the program in the memory 520 to further perform the following process:

sending a preamble on a currently active uplink bandwidth part BWP.

Optionally, the processor 500 reads the program in the memory 520 to further perform the following process:

sending a preamble on an uplink bandwidth part BWP corresponding to the first downlink BWP.

Optionally, the processor 500 reads the program in the memory 520 to further perform the following process:

when a random access attempt fails, sending the preamble on the active uplink BWP or on the uplink BWP corresponding to the first downlink BWP.

Optionally, the processor 500 reads the program in the memory 520 to further perform the following process:

resetting at least one of a preamble transmission counter or a power ramping counter.

Optionally, the processor 500 reads the program in the memory 520 to further perform the following processes:

falling back from contention free random access CFRA to contention free random access CFRA on the first downlink BWP; or falling back from contention free random access CFRA to contention based random access CBRA on the first downlink BWP.

Optionally, the processor 500 reads the program in the memory 520 to further perform the following processes:

when no control resource set CORESET or default control resource set CORESET corresponding to contention free random access CFRA is configured on the currently active downlink BWP or the serving cell, monitoring the RAR by falling back to a default CORESET 0 of a second downlink BWP; or when no control resource set CORESET or default CORESET corresponding to contention based random access CBRA is configured on the currently active downlink BWP or the serving cell, monitoring the RAR by falling back to a default CORESET 0 of a third downlink BWP; or when no control resource set CORESET or default control resource set CORESET corresponding to contention free random access CFRA is configured on the currently active downlink BWP or the serving cell, but a control resource set CORESET or default CORESET corresponding to contention based random access CBRA is configured on the currently active downlink BWP, monitoring the RAR by falling back to the control resource set CORESET or the default CORESET 0 of the CBRA on the currently active downlink BWP; or when no control resource set CORESET or default control resource set CORESET corresponding to contention based random access CBRA is configured on the currently active downlink BWP or the serving cell, but a control resource set CORESET or default CORESET corresponding to contention free random access CFRA is configured on the currently active downlink BWP, monitoring the RAR by falling back to the control resource set CORESET or the default CORESET 0 of the CFRA on the currently active downlink BWP, where the second downlink BWP or the third downlink BWP includes: an initial downlink BWP, or a non-initial downlink BWP configured with a default CORESET, or a BWP configured with a control resource set CORESET or default CORESET corresponding to the CBRA or the CFRA.

Optionally, the processor 500 reads the program in the memory 520 to further perform the following process:

when the currently active downlink BWP overlaps a fourth BWP, sending a random access preamble by using a public random access configuration broadcast on the fourth BWP or using resources of a public random access configuration configured by dedicated radio resource control RRC signaling, where the fourth BWP includes: an initial downlink BWP, or a BWP overlapping the currently active downlink BWP.

Figure 6:
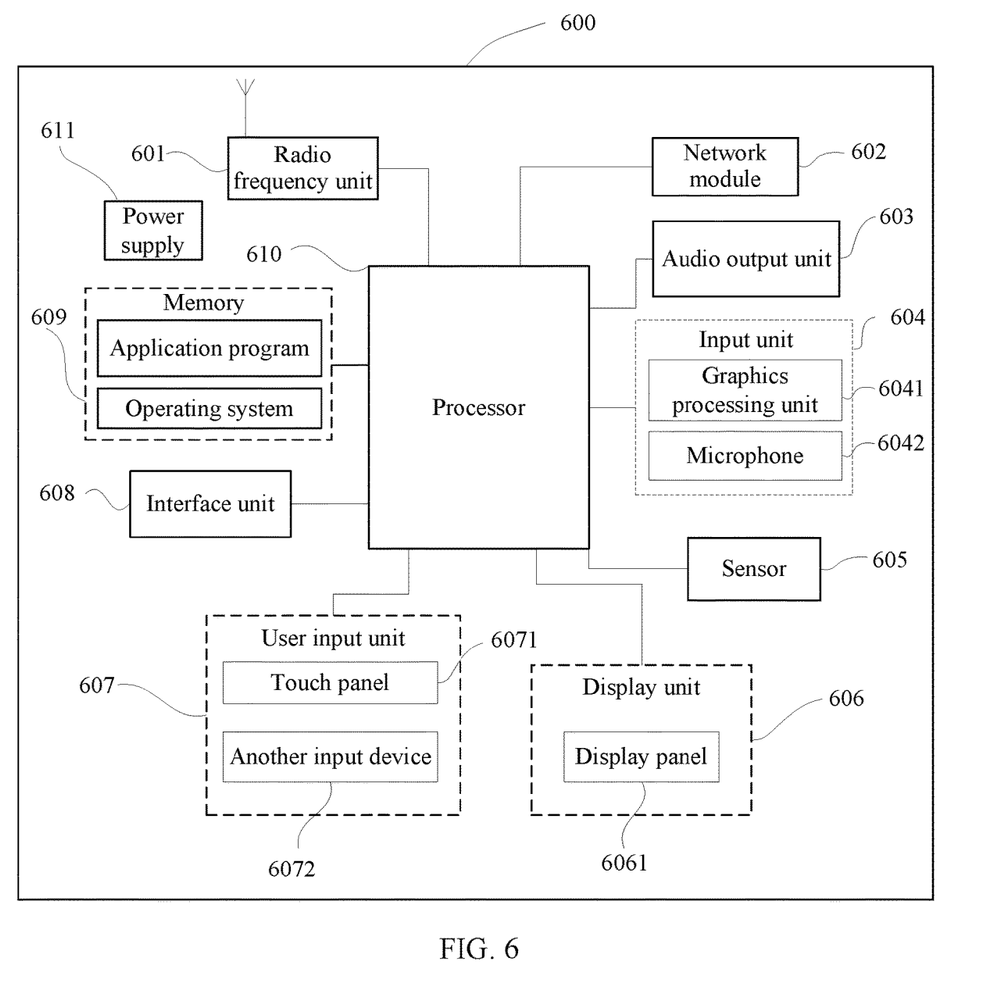
FIG. 6 is a second structural block diagram of a terminal according to an embodiment of the present disclosure.

FIG. 6 is a schematic structural diagram of hardware of a terminal implementing embodiments of the present disclosure. The terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components. A person skilled in the art may understand that the structure of the terminal shown in FIG. 6 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The processor 610 is configured to: receive configuration information of a currently active downlink bandwidth part BWP or a serving cell; and monitor a random access response RAR in a random access process based on a configuration of a control resource set CORESET in the configuration information of the currently active downlink BWP or the configuration information of the serving cell.

According to the foregoing technical solution in this embodiment of the present disclosure, the configuration information of the currently active downlink bandwidth part BWP or the serving cell is received; and the random access response RAR in the random access process is monitored based on the configuration of the control resource set CORESET in the configuration information of the currently active downlink BWP or the configuration information of the serving cell. Therefore, the problem that for an active downlink BWP, when there is no explicitly configured CORESET corresponding to a RAR or there is no corresponding CORESET 0, behavior of UE is unclear, is resolved.

It should be understood that, in this embodiment of the present disclosure, the radio frequency unit 601 can be configured to receive and transmit information, or receive and transmit signals during a call. Specifically, the radio frequency unit 601 receives downlink data from a network device, and transmits the downlink data to the processor 610 for processing; and in addition, transmits uplink data to the network device. Generally, the radio frequency unit 601 includes but is not limited to an antenna, at least one amplifier, a transceiver, a coupler, a low noise amplifier, a duplexer, and the like. In addition, the radio frequency unit 601 can also communicate with another device through a wireless communications system and network.

The terminal provides a user with wireless broadband Internet access through the network module 602, for example, helps the user send and receive emails, browse web pages, and access streaming media.

The audio output unit 603 can convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a speaker, a buzzer, a receiver, and the like.

The input unit 604 is configured to receive an audio signal or a video signal. The input unit 604 may include a graphics processing unit (Graphics Processing Unit, GPU) 6041 and a microphone 6042. The graphics processing unit 6041 is configured to process image data of a static picture or a video obtained by an image capture apparatus (for example, a camera) in video capture mode or image capture mode. A processed image frame can be displayed on the display unit 606. The image frame processed by the graphics processing unit 6041 can be stored in the memory 609 (or another storage medium) or sent via the radio frequency unit 601 or the network module 602. The microphone 6042 can receive sound and can process such sound into audio data. Processed audio data can be converted, in telephone call mode, into a format that can be sent to a mobile communication network device via the radio frequency unit 601 for output.

The terminal 600 further includes at least one sensor 605, such as a light sensor, a motion sensor, and other sensors. Specifically, the light sensor includes an ambient light sensor and a proximity sensor, where the ambient light sensor can adjust brightness of the display panel 6061 based on brightness of ambient light, and the proximity sensor can turn off the display panel 6061 and/or backlight when the terminal 600 moves towards the ear. As a motion sensor, an accelerometer sensor can detect magnitude of acceleration in various directions (usually three axes), can detect magnitude and the direction of gravity when stationary, can be configured to identify terminal postures (such as horizontal and vertical screen switch, related games, and magnetometer posture calibration), can perform functions related to vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information input by the user or information provided to the user. The display unit 606 may include the display panel 6061, and the display panel 6061 may be configured in a form of a liquid crystal display (Liquid Crystal Display, LCD), an organic light-emitting diode (Organic Light-Emitting Diode, OLED), or the like.

The user input unit 607 can be configured to receive input numeric or character information, and generate key signal inputs related to user settings and function control of the terminal. Specifically, the user input unit 607 includes a touch panel 6071 and another input device 6072. The touch panel 6071, also called a touch screen, can collect a touch operation of the user on or near the touch panel 6071 (For example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 610, receives a command sent by the processor 610, and executes the command. In addition, the touch panel 6071 can be implemented in various types such as resistive, capacitive, infrared, and surface acoustic wave. In addition to the touch panel 6071, the user input unit 607 may further include the another input device 6072. Specifically, the another input device 6072 may include but is not limited to a physical keyboard, function keys (such as a volume control key and a switch key), a trackball, a mouse, and a joystick. Details are not described herein.

Further, the touch panel 6071 can cover the display panel 6061. When detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. Although in FIG. 6, the touch panel 6071 and the display panel 6061 are configured as two independent components to implement input and output functions of the terminal, in some embodiments, the touch panel 6071 and the display panel 6061 can be integrated to implement the input and output functions of the terminal. Details are not limited herein.

The interface unit 608 is an interface for connecting an external apparatus to the terminal 600. For example, the external apparatus may include a wired or wireless headphone port, an external power supply (or a battery charger) port, a wired or wireless data port, a storage card port, a port for connecting an apparatus having an identification module, an audio input/output (I/O) port, a video I/O port, a headphone port, or the like. The interface unit 608 can be configured to receive an input (for example, data information and power) from the external apparatus and transmit the received input to one or more elements in the terminal 600, or transmit data between the terminal 600 and the external apparatus.

The memory 609 may be configured to store software programs and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 609 may include a high-speed random access memory or a nonvolatile memory, for example, at least one disk storage device, a flash memory, or another volatile solid-state storage device.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may integrate an application processor with a modem processor. The application processor mainly processes the operating system, a user interface, the application program, and the like, and the modem processor mainly processes wireless communication. It may be understood that the foregoing modem processor may not be integrated into the processor 610.

The terminal 600 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 600 includes some function modules not shown. Details are not described herein.

Figure 7:
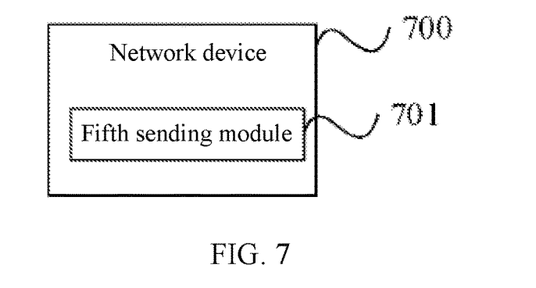
FIG. 7 is a schematic diagram of modules of a network device according to an embodiment of the present disclosure.

As shown in FIG. 7, an embodiment of the present disclosure further provides a network device 700, including:

a fifth sending module 701, configured to send configuration information of a currently active downlink bandwidth part BWP or a serving cell, where the configuration information of the currently active downlink BWP or the serving cell includes a configuration of a control resource set CORESET.

The network device in this embodiment of the present disclosure further includes:

a sixth sending module, configured to send a random access response RAR in a random access process.

According to the network device in this embodiment of the present disclosure, the configuration information of the currently active downlink bandwidth part BWP or the serving cell is sent to a terminal, so that the terminal monitors the random access response RAR in the random access process based on a configuration of a CORESET in the configuration information of the currently active downlink BWP or the serving cell. Therefore, the problem that for an active downlink BWP, when there is no explicitly configured CORESET corresponding to an RAR or there is no corresponding CORESET #0, behavior of UE is unclear, is resolved.

An embodiment of the present disclosure further provides a network device, including: a memory, a processor, and a computer program stored in the memory and executable on the processor, where the computer program, when executed by the processor, implements the processes of the foregoing method embodiment of the random access method applied to the network device, and the same technical effects can be achieved. To avoid repetition, details are not described herein again.

An embodiment of the present disclosure further provides a computer readable storage medium, where the computer readable storage medium stores a computer program, the computer program, when executed by the processor, implements the processes of the foregoing method embodiment of the random access method applied to the network device, and the same technical effects can be achieved. To avoid repetition, details are not described herein again. The computer readable storage medium may be a read-only memory (Read-Only Memory, ROM), a random access memory (Random Access Memory, RAM), a magnetic disk, a compact disc, or the like.

Figure 8:
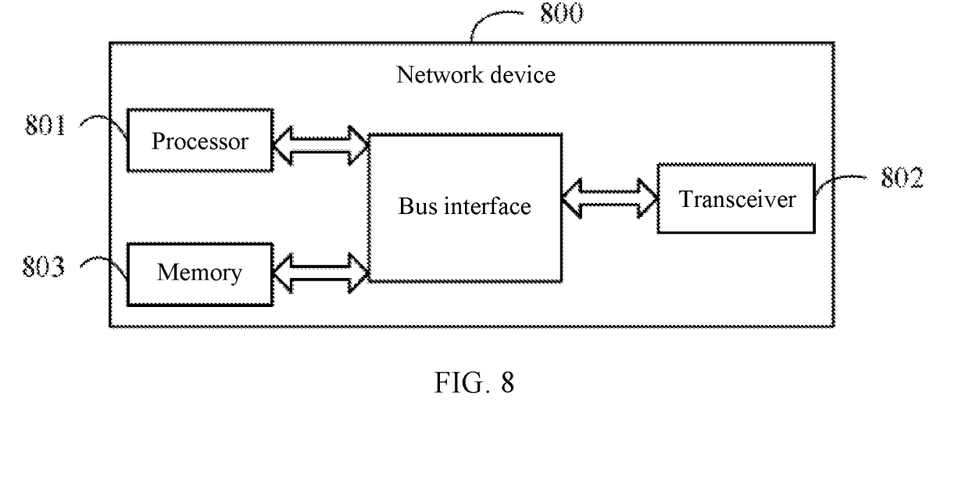
FIG. 8 is a structural block diagram of a network device according to an embodiment of the present disclosure.

As shown in FIG. 8, an embodiment of the present disclosure further provides a network device 800, including a processor 801, a transceiver 802, a memory 803, and a bus interface.

The processor 801 is configured to read a program in the memory 803 to perform the following process:

sending configuration information of a currently active downlink bandwidth part BWP or a serving cell, where the configuration information of the currently active downlink BWP or the serving cell includes a configuration of a control resource set CORESET.

In FIG. 8, a bus architecture may include any quantity of interconnected buses and bridges, which are specifically connected together by one or more processors represented by the processor 801 and various circuits of a memory represented by the memory 803. The bus architecture may further connect together various other circuits of a peripheral device, a voltage stabilizer, a power management circuit, and the like, which are known in this art and will not be further described herein. The bus interface provides an interface. The transceiver 802 may include a plurality of elements, that is, include a transmitter and a receiver, and provide units for communication with various other apparatuses on a transmission medium.

The processor 801 is responsible for management of the bus architecture and general processing. The memory 803 may store data used by the processor 801 when operations are performed.

Optionally, the processor 801 reads the program in the memory 803 to further perform the following process:

sending a random access response RAR in a random access process.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. Without being subject to further limitations, an element defined by a phrase "including a . . . " does not exclude presence of other identical elements in the process, method, article, or apparatus that includes the very element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of the present disclosure essentially, or the part contributing to the related technologies may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the protection scope of aims of the present disclosure and claims, all of which fall within the protection of the present disclosure.

The invention claimed is:

1. A random access method, performed by a terminal, comprising:
receiving configuration information of a currently active downlink bandwidth part (BWP) or a serving cell; and
monitoring a random access response (RAR) in a random access process based on a configuration of a control resource set (CORESET) in the configuration information of the currently active downlink BWP or the configuration information of the serving cell;
wherein the step of monitoring a random access response RAR in a random access process based on a configuration of a control resource set CORESET in the configuration information of the currently active downlink BWP or the configuration information of the serving cell comprises:
when no CORESET is explicitly configured on the currently active downlink BWP or the serving cell, monitoring the random access response RAR in the random access process based on a configuration of a default CORESET 0; or
when a CORESET is configured on the currently active downlink BWP or the serving cell, monitoring the random access response RAR in the random access process based on the configured CORESET;
wherein the step of monitoring the random access response RAR in the random access process based on a configuration of a default CORESET 0 comprises:
when the default CORESET 0 is not configured on the currently active downlink BWP or the serving cell, falling back to a first downlink BWP, and monitoring the RAR in the random access process on a default CORESET 0 on the first downlink BWP; or
when the default CORESET 0 is configured on the currently active downlink BWP or the serving cell, falling back to a first downlink BWP, and monitoring the RAR in the random access process on a default CORESET 0 on the first downlink BWP, wherein
the first downlink BWP comprises: an initial downlink BWP, or a non-initial downlink BWP configured with a default CORESET;
wherein before the falling back to a first downlink BWP, the method further comprises:
sending a preamble on a currently active uplink bandwidth part BWP.

2. The random access method according to claim 1, wherein the step of monitoring the random access response RAR in the random access process based on a configuration of a default CORESET 0 comprises:
when the default CORESET 0 is configured on the currently active downlink BWP or the serving cell, monitoring the RAR in the random access process by directly falling back to the default CORESET 0 of the currently active downlink BWP or the serving cell.

3. The random access method according to claim 1, wherein after the falling back to a first downlink BWP, the method further comprises:
   sending a preamble on an uplink bandwidth part BWP corresponding to the first downlink BWP.

4. The random access method according to claim 1, further comprising:
   when a random access attempt fails, sending the preamble on the active uplink BWP or on the uplink BWP corresponding to the first downlink BWP.

5. The random access method according to claim 1, wherein after the falling back to a first downlink BWP, the method further comprises:
   resetting at least one of a preamble transmission counter or a power ramping counter.

6. The random access method according to claim 1, wherein the falling back to a first downlink BWP comprises:
   falling back from contention free random access (CFRA) on the currently active downlink BWP to contention free random access (CFRA) on the first downlink BWP; or
   falling back from contention free random access (CFRA) on the currently active downlink BWP to contention based random access (CBRA) on the first downlink BWP.

7. The random access method according to claim 1, wherein the step of monitoring a random access response RAR in a random access process based on a configuration of a control resource set CORESET in the configuration information of the currently active downlink BWP or the configuration information of the serving cell comprises:
   when no control resource set CORESET or default control resource set CORESET corresponding to contention free random access (CFRA) is configured on the currently active downlink BWP or the serving cell, monitoring the RAR by falling back to a default CORESET 0 of a second downlink BWP; or
   when no control resource set CORESET or default CORESET corresponding to contention based random access (CBRA) is configured on the currently active downlink BWP or the serving cell, monitoring the RAR by falling back to a default CORESET 0 of a third downlink BWP; or
   when no control resource set CORESET or default control resource set CORESET corresponding to contention free random access (CFRA) is configured on the currently active downlink BWP or the serving cell, but a control resource set CORESET or default CORESET corresponding to contention based random access (CBRA) is configured on the currently active downlink BWP, monitoring the RAR by falling back to the control resource set CORESET or the default CORESET 0 of the CBRA on the currently active downlink BWP; or
   when no control resource set CORESET or default control resource set CORESET corresponding to contention based random access (CBRA) is configured on the currently active downlink BWP or the serving cell, but a control resource set CORESET or default CORESET corresponding to contention free random access (CFRA) is configured on the currently active downlink BWP, monitoring the RAR by falling back to the control resource set CORESET or the default CORESET 0 of the CFRA on the currently active downlink BWP, wherein
   the second downlink BWP or the third downlink BWP comprises: an initial downlink BWP, or a non-initial downlink BWP configured with a default CORESET, or a BWP configured with a control resource set CORESET or default CORESET corresponding to the CBRA or the CFRA.

8. The random access method according to claim 1, wherein before the step of monitoring a random access response RAR in a random access process based on a configuration of a control resource set CORESET in the configuration information of the currently active downlink BWP or the configuration information of the serving cell, the method comprises:
   when the currently active downlink BWP overlaps a fourth BWP, sending a random access preamble by using a public random access configuration broadcast on the fourth BWP or using resources of a public random access configuration configured by dedicated radio resource control RRC signaling, wherein
   the fourth BWP comprises: an initial downlink BWP, or a BWP overlapping the currently active downlink BWP.

9. A random access method, performed by a terminal, comprising:
   receiving configuration information of a currently active downlink bandwidth part (BWP) or a serving cell; and
   monitoring a random access response (RAR) in a random access process based on a configuration of a control resource set (CORESET) in the configuration information of the currently active downlink BWP or the configuration information of the serving cell;
   wherein before the step of monitoring a random access response RAR in a random access process based on a configuration of a control resource set CORESET in the configuration information of the currently active downlink BWP or the configuration information of the serving cell, the method comprises:
   when the currently active downlink BWP overlaps a fourth BWP, sending a random access preamble by using a public random access configuration broadcast on the fourth BWP or using resources of a public random access configuration configured by dedicated radio resource control RRC signaling, wherein
   the fourth BWP comprises: an initial downlink BWP, or a BWP overlapping the currently active downlink BWP.

10. The random access method according to claim 9, wherein the step of monitoring a random access response RAR in a random access process based on a configuration of a control resource set CORESET in the configuration information of the currently active downlink BWP or the configuration information of the serving cell comprises:
    when no CORESET is explicitly configured on the currently active downlink BWP or the serving cell, monitoring the random access response RAR in the random access process based on a configuration of a default CORESET 0; or
    when a CORESET is configured on the currently active downlink BWP or the serving cell, monitoring the random access response RAR in the random access process based on the configured CORESET.

11. The random access method according to claim 10, wherein the step of monitoring the random access response RAR in the random access process based on a configuration of a default CORESET 0 comprises:
    when the default CORESET 0 is configured on the currently active downlink BWP or the serving cell, monitoring the RAR in the random access process by directly falling back to the default CORESET 0 of the currently active downlink BWP or the serving cell.

12. The random access method according to claim 10, wherein the step of monitoring the random access response RAR in the random access process based on a configuration of a default CORESET 0 comprises:

when the default CORESET 0 is not configured on the currently active downlink BWP or the serving cell, falling back to a first downlink BWP, and monitoring the RAR in the random access process on a default CORESET 0 on the first downlink BWP; or when the default CORESET 0 is configured on the currently active downlink BWP or the serving cell, falling back to a first downlink BWP, and monitoring the RAR in the random access process on a default CORESET 0 on the first downlink BWP, wherein the first downlink BWP comprises: an initial downlink BWP, or a non-initial downlink BWP configured with a default CORESET.

13. The random access method according to claim 12, wherein before the falling back to a first downlink BWP, the method further comprises:

sending a preamble on a currently active uplink bandwidth part BWP.

14. The random access method according to claim 13, further comprising:

when a random access attempt fails, sending the preamble on the active uplink BWP or on the uplink BWP corresponding to the first downlink BWP.

15. The random access method according to claim 9, wherein the step of monitoring a random access response RAR in a random access process based on a configuration of a control resource set CORESET in the configuration information of the currently active downlink BWP or the configuration information of the serving cell comprises:

when no control resource set CORESET or default control resource set CORESET corresponding to contention free random access (CFRA) is configured on the currently active downlink BWP or the serving cell, monitoring the RAR by falling back to a default CORESET 0 of a second downlink BWP; or when no control resource set CORESET or default CORESET corresponding to contention based random access (CBRA) is configured on the currently active downlink BWP or the serving cell, monitoring the RAR by falling back to a default CORESET 0 of a third downlink BWP; or when no control resource set CORESET or default control resource set CORESET corresponding to contention free random access (CFRA) is configured on the currently active downlink BWP or the serving cell, but a control resource set CORESET or default CORESET corresponding to contention based random access (CBRA) is configured on the currently active downlink BWP, monitoring the RAR by falling back to the control resource set CORESET or the default CORESET 0 of the CBRA on the currently active downlink BWP; or when no control resource set CORESET or default control resource set CORESET corresponding to contention based random access (CBRA) is configured on the currently active downlink BWP or the serving cell, but a control resource set CORESET or default CORESET corresponding to contention free random access (CFRA) is configured on the currently active downlink BWP, monitoring the RAR by falling back to the control resource set CORESET or the default CORESET 0 of the CFRA on the currently active downlink BWP, wherein the second downlink BWP or the third downlink BWP comprises: an initial downlink BWP, or a non-initial downlink BWP configured with a default CORESET, or a BWP configured with a control resource set CORESET or default CORESET corresponding to the CBRA or the CFRA.

16. A terminal, comprising: a memory, a processor, and a computer program stored in the memory and executable on the processor, wherein the computer program, when executed by the processor, implements the steps in the random access method according to claim 9.

17. The terminal according to claim 16, wherein in the random access method implemented by the computer program, the step of monitoring a random access response RAR in a random access process based on a configuration of a control resource set CORESET in the configuration information of the currently active downlink BWP or the configuration information of the serving cell comprises:

when no CORESET is explicitly configured on the currently active downlink BWP or the serving cell, monitoring the random access response RAR in the random access process based on a configuration of a default CORESET 0; or when a CORESET is configured on the currently active downlink BWP or the serving cell, monitoring the random access response RAR in the random access process based on the configured CORESET.

18. A terminal, comprising: a memory, a processor, and a computer program stored in the memory and executable on the processor, wherein the computer program, when executed by the processor, implements the steps in a random access method, the method comprising:

receiving configuration information of a currently active downlink bandwidth part BWP or a serving cell; and monitoring a random access response RAR in a random access process based on a configuration of a control resource set CORESET in the configuration information of the currently active downlink BWP or the configuration information of the serving cell;

wherein the step of monitoring a random access response RAR in a random access process based on a configuration of a control resource set CORESET in the configuration information of the currently active downlink BWP or the configuration information of the serving cell comprises:

when no CORESET is explicitly configured on the currently active downlink BWP or the serving cell, monitoring the random access response RAR in the random access process based on a configuration of a default CORESET 0; or when a CORESET is configured on the currently active downlink BWP or the serving cell, monitoring the random access response RAR in the random access process based on the configured CORESET;

wherein the step of monitoring the random access response RAR in the random access process based on a configuration of a default CORESET 0 comprises:

when the default CORESET 0 is not configured on the currently active downlink BWP or the serving cell, falling back to a first downlink BWP, and monitoring the RAR in the random access process on a default CORESET 0 on the first downlink BWP; or when the default CORESET 0 is configured on the currently active downlink BWP or the serving cell, falling back to a first downlink BWP, and monitoring the RAR in the random access process on a default CORESET 0 on the first downlink BWP, wherein the first downlink BWP comprises: an initial downlink BWP, or a non-initial downlink BWP configured with a default CORESET;
wherein before the falling back to a first downlink BWP, the method further comprises:
sending a preamble on a currently active uplink bandwidth part BWP.

19. The terminal according to claim 18, wherein in the random access method implemented by the computer program, the step of monitoring the random access response RAR in the random access process based on a configuration of a default CORESET 0 comprises:
when the default CORESET 0 is configured on the currently active downlink BWP or the serving cell, monitoring the RAR in the random access process by directly falling back to the default CORESET 0 of the currently active downlink BWP or the serving cell.

20. The terminal according to claim 18, wherein in the random access method implemented by the computer program, after the falling back to a first downlink BWP, the method further comprises:
sending a preamble on an uplink bandwidth part BWP corresponding to the first downlink BWP.

* * * * *